US012798678B2

(12) United States Patent
Miyanaga et al.

(10) Patent No.: US 12,798,678 B2
(45) Date of Patent: Nov. 17, 2026

(54) VEHICLE BODY REAR STRUCTURE

(71) Applicant: HONDA MOTOR CO., LTD., Tokyo (JP)

(72) Inventors: Hiroyo Miyanaga, Wako (JP); Masayasu Yoshida, Wako (JP); Yasunori Watanabe, Wako (JP); Satoru Kawabe, Wako (JP); Hisashi Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 703 days.

(21) Appl. No.: 18/219,127

(22) Filed: Jul. 7, 2023

(65) Prior Publication Data

US 2024/0017768 A1 Jan. 18, 2024

(30) Foreign Application Priority Data

Jul. 14, 2022 (JP) ................................. 2022-113254

(51) Int. Cl.
*B62D 21/15* (2006.01)
*B60K 13/04* (2006.01)
*F01N 13/18* (2010.01)

(52) U.S. Cl.
CPC ............ *B62D 21/152* (2013.01); *B60K 13/04* (2013.01); *F01N 13/1811* (2013.01)

(58) Field of Classification Search
CPC ........ B62D 25/08; B62D 25/20; B62D 21/15; B62D 21/152; B60K 13/04; B60R 19/00; B60R 19/24; B60R 19/26; B60R 2019/007; B60R 2019/242; B60R 2019/262; F01N 13/1811; F01N 13/1805; F01N 13/1822
See application file for complete search history.

(56) References Cited

U.S. PATENT DOCUMENTS 5,321,214 A * 6/1994 Uegane .................. F01N 13/16 181/246
5,381,871 A * 1/1995 Ohta .................... B62D 21/155 296/187.11
10,864,816 B2 * 12/2020 Kato ...................... B62D 25/20
(Continued)

FOREIGN PATENT DOCUMENTS

DE 4243456 6/1994
DE 102014209604 A1 * 11/2015 ............. B60K 13/04
EP 352838 A * 1/1990
(Continued)

OTHER PUBLICATIONS

Chinese Office Action for Chinese Patent Application No. 202310823498.0 mailed Mar. 25, 2026.

*Primary Examiner* — Edgardo San Martin

(74) *Attorney, Agent, or Firm* — Amin, Turocy & Watson, LLP

(57) ABSTRACT

A vehicle body rear structure includes a rear wheel, a rear side frame, and a collapsing member. The rear wheel is disposed on a vehicle side portion. The rear side frame is disposed substantially along a vehicle forward/rearward direction and extends to a vehicle-rear-side than a rear wheel. The collapsing member is disposed at the vehicle-rear-side of the rear wheel so that at least a part of the collapsing member overlaps the rear wheel in the forward/rearward direction. The collapsing member is fixed to the rear side frame.

3 Claims, 5 Drawing Sheets

(56) References Cited

U.S. PATENT DOCUMENTS

| | | | | |
|---|---|---|---|---|
| 12,097,902 | B2 * | 9/2024 | Watanabe | B60R 19/18 |
| 2024/0034141 | A1 * | 2/2024 | Yoshida | B62D 25/087 |

FOREIGN PATENT DOCUMENTS

| | | | | | |
|---|---|---|---|---|---|
| EP | 3831634 | | | 6/2021 | |
| FR | 3117416 | A1 | * | 6/2022 | F01N 13/16 |
| JP | 06-016154 | | | 1/1994 | |
| JP | 3133098 | B2 | * | 2/2001 | |
| JP | 2004-001634 | | | 1/2004 | |
| JP | 2012166611 | A | * | 9/2012 | B60K 13/04 |
| JP | 2015189447 | A | * | 11/2015 | |
| JP | 2017178026 | A | * | 10/2017 | |
| JP | 2018-188022 | | | 11/2018 | |
| JP | 2022043911 | A | * | 3/2022 | B62D 25/20 |
| JP | 2022063637 | A | * | 4/2022 | |
| KR | 100475965 | B1 | * | 3/2005 | B62D 21/152 |

* cited by examiner

VEHICLE BODY REAR STRUCTURE

CROSS-REFERENCE TO RELATED APPLICATION

Priority is claimed on Japanese Patent Application No. 2022-113254, filed Jul. 14, 2022, the content of which is incorporated herein by reference.

BACKGROUND OF THE INVENTION

Field of the Invention

The present invention relates to a vehicle body rear structure.

Description of Related Art

A pair of rear side frames extending in a vehicle forward/rearward direction are disposed on a rear part of a vehicle body on left and right sides, and a bumper beam is connected to rear parts of the left and right rear side frames. When an impact load is input from behind the vehicle, the left and right rear side frames absorb energy of the input impact load by collapsing in the axial direction (vehicle forward/rearward direction).

In recent years, behind the vehicle body rear structure that can absorb more impact load energy when an impact load is input from behind the vehicle has been devised (for example, see Japanese Unexamined Patent Application, First Publication No. 2004-1634, and Japanese Unexamined Patent Application, First Publication No. H06-16154).

In the vehicle body rear structure disclosed in Japanese Unexamined Patent Application, First Publication No. 2004-1634, side pockets recessed downward in substantially a U shape are formed on left and right end portions of a rear floor, and the side pockets are disposed behind left and right rear wheels so as to overlap the rear wheels in the forward/rearward direction. The side pockets have substantially U-shaped concave portions extending in a vehicle forward/rearward direction.

In the vehicle body rear structure, when the impact load is input from behind the vehicle, the input weight is distributed and transmitted to the rear side frames and the side pockets of the rear floor. Energy of the input impact load is absorbed by collapsing the rear side frames and the side pockets.

In addition, in the vehicle body rear structure disclosed in Japanese Unexamined Patent Application, First Publication No. H06-16154, a tire abutting member and a crushable member facing the rear parts of the rear wheels are serially disposed behind the left and right rear wheels.

In the vehicle body rear structure, when the impact load is input from behind the vehicle, the input weight is distributed and transmitted to the rear side frame and the crushable member. When the impact load is input from behind the crushable member, the crushable member abuts the rear wheel via the tire abutting part, and the crushable member collapses in the axial direction (vehicle forward/rearward direction). As a result, the energy of the impact load input from the rear is absorbed by collapsing the rear side frame and the crushable member.

SUMMARY OF THE INVENTION

Since the rear side frame disposed on the rear part of the vehicle is a member extending lengthwise in the vehicle forward/rearward direction, the rear side frame may be bent and deformed at an intermediate part in an extension direction according to an input position, a direction, or the like, of the impact load input from behind the vehicle. For this reason, even in the case of the vehicle body rear structure disclosed in Japanese Unexamined Patent Application, First Publication No. 2004-1634, and Japanese Unexamined Patent Application, First Publication No. H06-16154, when the rear side frame is bent and deformed upon input of the impact load, there is concern that a sufficient energy absorption effect will not be able to be obtained due to the collapse of the rear side frame.

An aspect of the present invention is directed to providing a vehicle body rear structure capable of stably collapsing a rear side frame upon input of an impact load from behind a vehicle. Then, as a result, the present invention enhances collision safety of the vehicle and contributes to development of a sustainable transportation system.

A vehicle body rear structure of an aspect of the present invention includes a rear wheel (for example, a rear wheel (Wr) of an embodiment) disposed on a vehicle side portion; a rear side frame (for example, a rear side frame (10) of the embodiment) that is disposed substantially along a vehicle forward/rearward direction and that extends to a vehicle-rear-side than the rear wheel; and a collapsing member (for example, a silencer (14) of the embodiment) that is disposed at the vehicle-rear-side of the rear wheel so that at least a part of the collapsing member overlaps the rear wheel in the forward/rearward direction, the collapsing member being fixed to the rear side frame.

In the above-mentioned configuration, when an impact load is input to the rear part of the vehicle from an object on the rear side, the impact load is transmitted to the rear side frame. The rear side frame receives the impact load and gradually collapse, and the collapsing member is sandwiched between the object on the rear side of the vehicle and the rear wheel according to the progress of the collapse of the rear side frame. Here, the collapsing member collapses together with the rear side frame, and energy of the impact load from behind the vehicle is absorbed. From this state, when the input of the impact load further progresses, while an intermediate part of the rear side frame in an extension direction is folded and deformed, since the rear side frame is fixed to the collapsing member sandwiched between the object on the rear side and the rear wheel, folding deformation of the rear side frame at the intermediate part is restricted by the collapsing member. As a result, in a state in which folding deformation of the rear side frame is restricted, energy of the impact load is sufficiently absorbed by the collapse of the rear side frame and the collapsing member.

The collapsing member may be a silencer for exhaust silencing (for example, the silencer (14) of the embodiment).

In this case, the impact load can be efficiently absorbed using the silencer dedicated to exhaust silencing without specially providing the collapsing member dedicated to impact absorption. Accordingly, when the configuration is employed, it is possible to improve safety of the vehicle while suppressing increase in product costs of the vehicle.

The collapsing member may be fixed to the rear side frame at a position in front side than an intermediate position (an intermediate position cp) between the rear wheel and a rear end portion of the rear side frame.

In this case, since the collapsing member is fixed to a front side than the intermediate position of the rear side frame, upon input of the impact load from behind the vehicle, when the rear side frame begins to collapse from the rear side, the position of the collapsing member is less likely to change greatly. For this reason, upon input of the impact load from behind the vehicle, the collapsing member is stably sandwiched between the object behind the vehicle and the rear wheel. Accordingly, when the configuration is employed, upon input of the impact load from behind the vehicle, folding deformation of the rear side frame at the intermediate part can be more reliably restricted.

The collapsing member is preferably fixed to a lower surface (for example, a lower surface (14*u*) of the embodiment) of the rear side frame at below the rear side frame.

In this case, upon input of the impact load from behind the vehicle, when the collapsing member is sandwiched between the object behind the vehicle and the rear wheel, the collapsing member efficiently suppresses folding deformation of the rear side frame in the upward/downward direction from the lower side of the rear side frame. For this reason, in comparison with the case in which the collapsing member is fixed to the side surface of the rear side frame, twisting deformation is less likely to occur in the rear side frame. When the configuration is employed, upon input of the impact load from behind the vehicle, the rear side frame can be more stably collapsed.

In the vehicle body rear structure according to the present invention, folding deformation of the rear side frame can be restricted by the collapsing member sandwiched between the object on the rear side and the rear wheel upon input of the impact load from behind the vehicle. Accordingly, when the vehicle body rear structure of the present invention is employed, upon input of the impact load from behind the vehicle, the rear side frame can be stably collapsed.

DETAILED DESCRIPTION OF THE INVENTION

Figure 1:
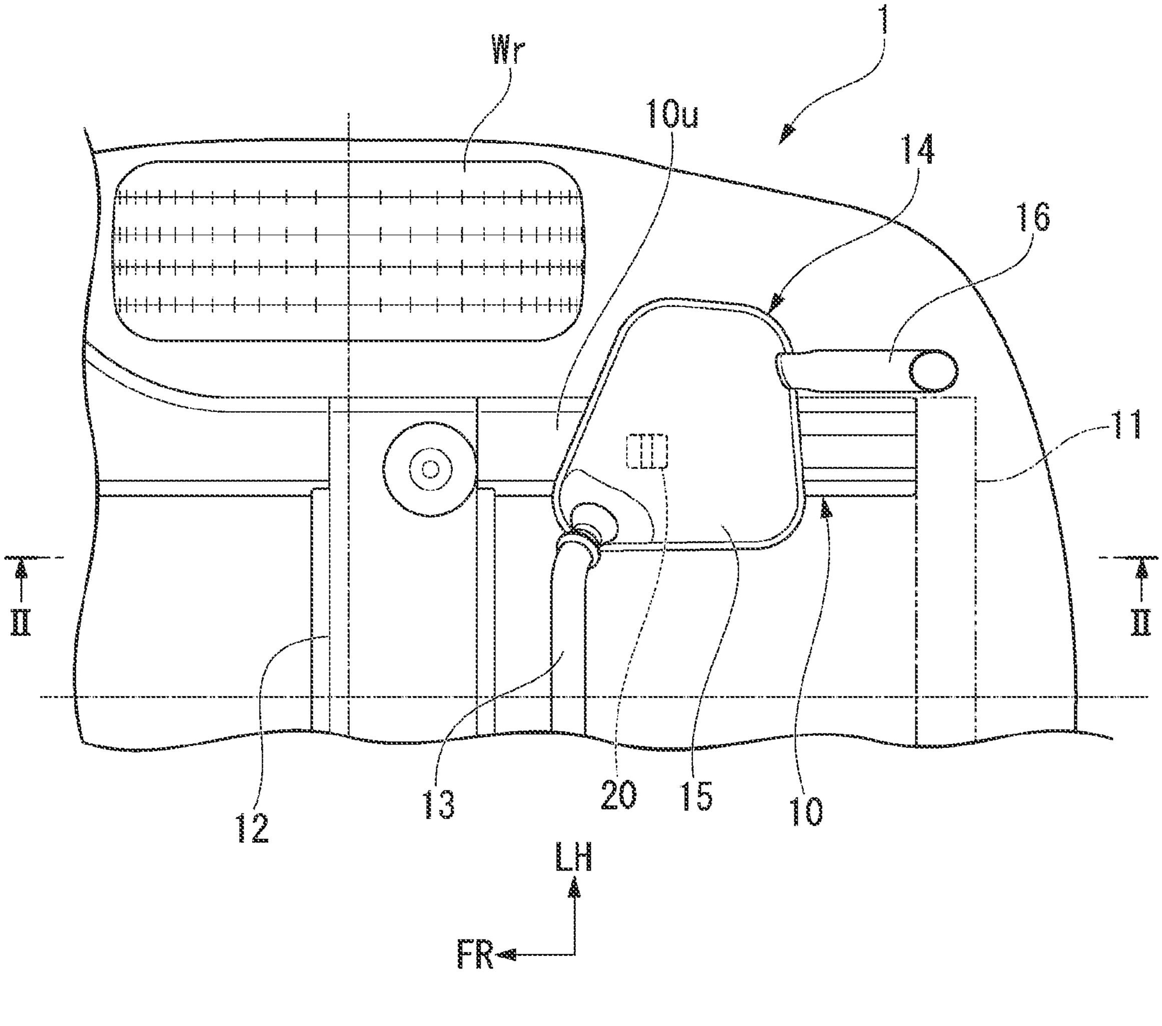
FIG. 1 is a bottom view of a rear part of a vehicle of an embodiment.

Hereinafter, an embodiment of the present invention will be described with reference to the accompanying drawings. Further, in the following description, directions of forward, rearward, upward, downward, leftward and rightward refer to directions with respect to a direction of advance of a vehicle unless otherwise specified. In addition, at appropriate places in the drawings, an arrow FR indicates the forward direction of the vehicle, an arrow UP indicates the upward direction of the vehicle, and an arrow LH indicates the leftward direction of the vehicle.

Figure 2:
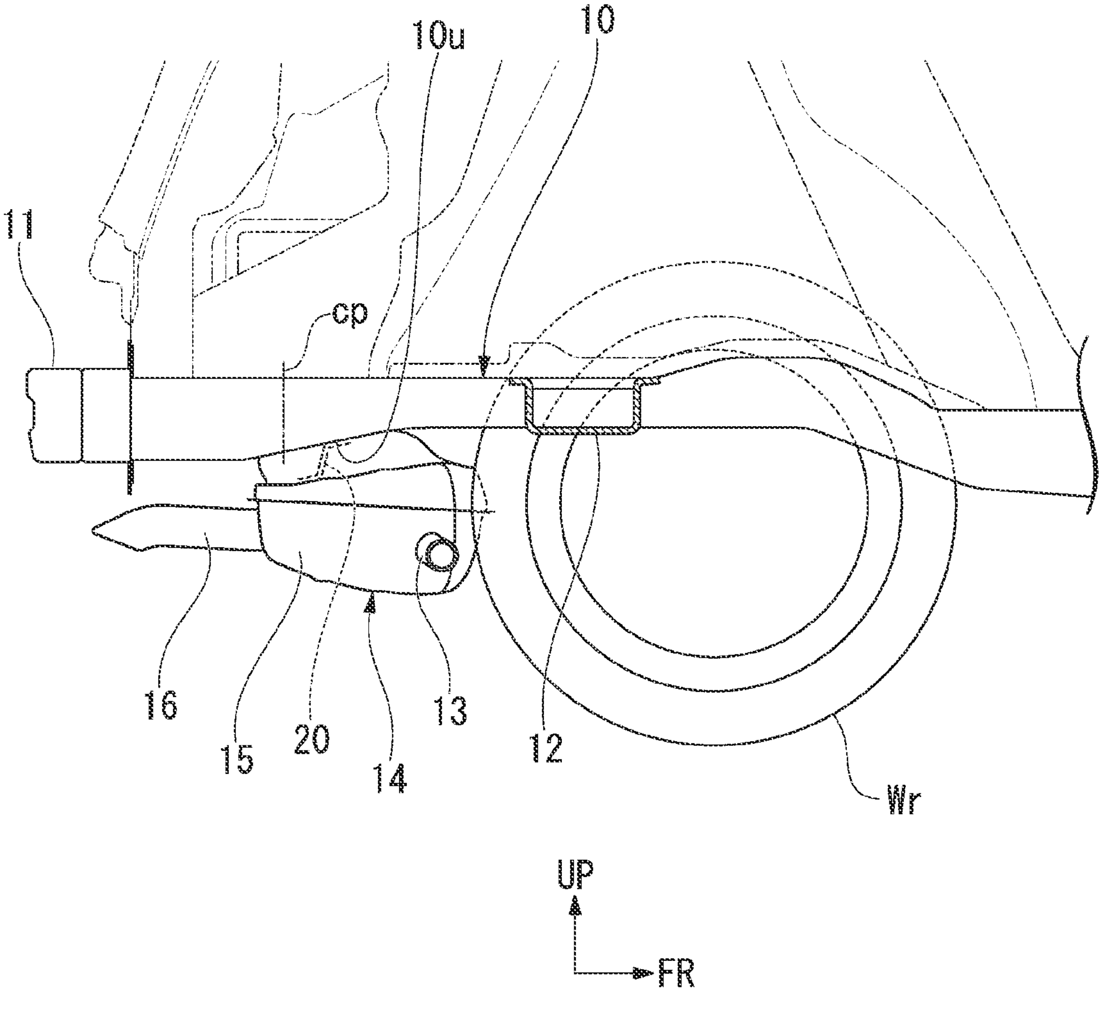
FIG. 2 is a cross-sectional view of the vehicle of the embodiment along line II-II in FIG. 1.

FIG. 1 is a view of a rear part of a vehicle 1 of the embodiment when seen from below, and FIG. 2 is a cross-sectional view along line II-II in FIG. 1.

In FIG. 1 and FIG. 2, reference sign Wr designates rear wheels disposed on left and right side portions of the vehicle 1. The rear wheels Wr are symmetrically disposed on left and right side portions of the vehicle 1. In addition, a pair of rear side frames 10 are disposed below the rear part of the vehicle 1 on left and right sides away from each other. In FIG. 1, while only a left half of the rear part of the vehicle 1 is shown, the rear side frame 10 is also disposed similarly on a right side of the rear part of the vehicle.

The left and right rear side frames 10 extend substantially along the vehicle forward/rearward direction. Front end portions of the rear side frames 10 are connected to side sills (not shown) below side portions of a passenger compartment at front of the rear wheels Wr of the vehicle. A rear floor (not shown) bridges between the left and right rear side frames 10 on the side of the upper surface. Each of the left and right rear side frames 10 extends toward a vehicle-rear-side than the rear wheel Wr of the vehicle. In addition, a bumper beam 11 of a rear bumper is connected to a rear end portion of each of the left and right rear side frames 10.

Intermediate parts of the left and right rear side frames 10 in a longitudinal direction are connected to each other by the cross member 12. The left and right rear wheels Wr are disposed on an outer side than a connecting position with a cross member 12 of the rear side frames 10 in the vehicle width direction.

In addition, an exhaust pipe 13 connected to an engine (not shown) is disposed below the vehicle 1 on the side of the rear part. A silencer 14 for exhaust silencing is connected to the exhaust pipe 13. The silencer 14 includes a housing 15 formed in a predetermined shape and configured to accommodate a silencing mechanism, and a tail pipe 16 extending from the rear part of the housing 15 toward the rear of the vehicle. The housing 15 and the silencing mechanism therein are formed of a metal material. The silencing mechanism is constituted by, for example, silencing chambers partitioned into a plurality of layers, a connecting pipe configured to allow communication between the silencing chambers, and the like.

In the embodiment, the silencer 14 is used as a collapsing member, which will be described below. That is, the silencer 14 absorbs energy of the impact load by the housing 15 and the silencing mechanism accommodated in the housing 15 being collapsed when the impact load is received from behind the vehicle.

Figure 3:
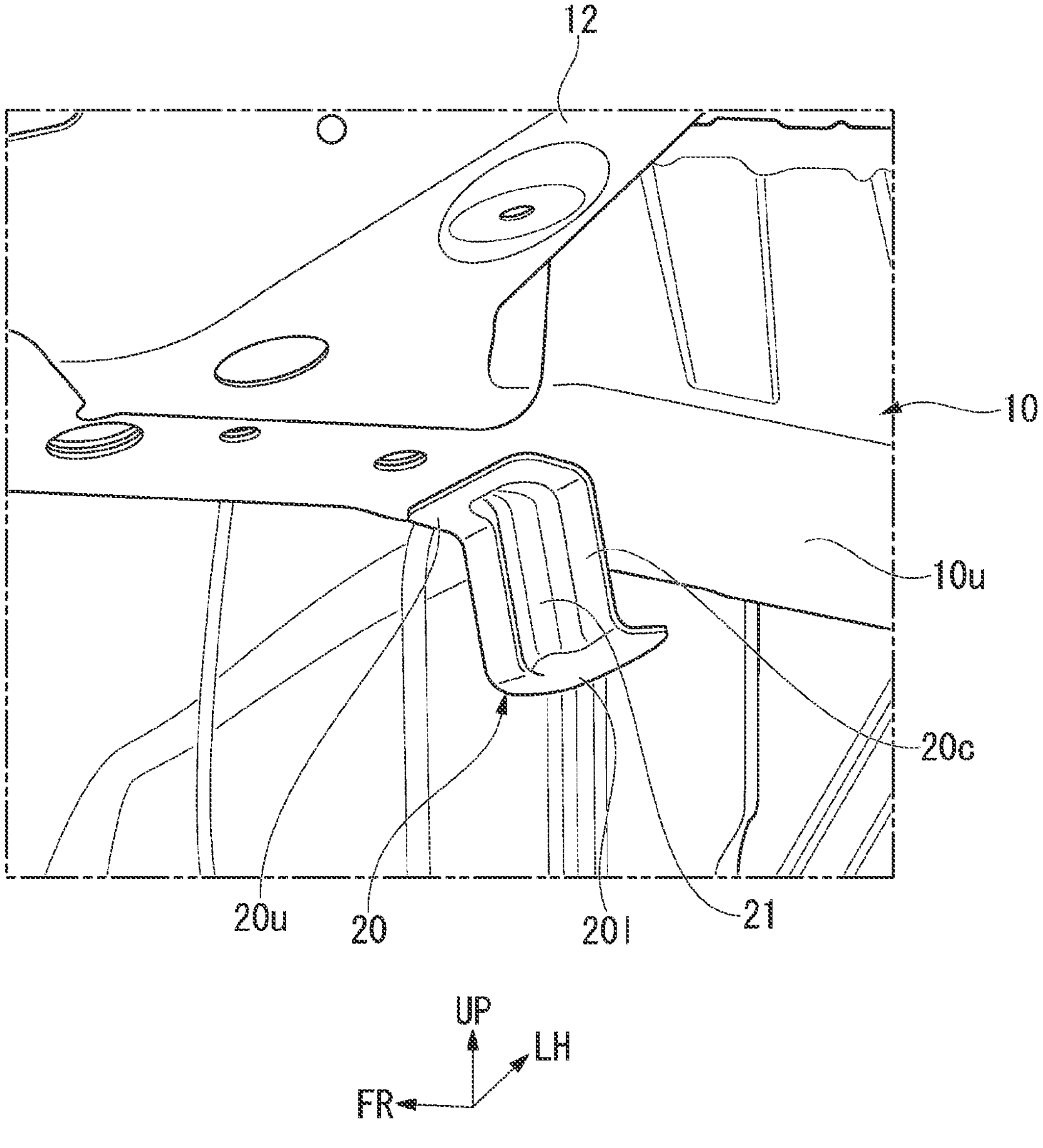
FIG. 3 is a perspective view of an area of the vehicle of the embodiment, to which a silencer is attached, when seen from below the vehicle.
Figure 4:
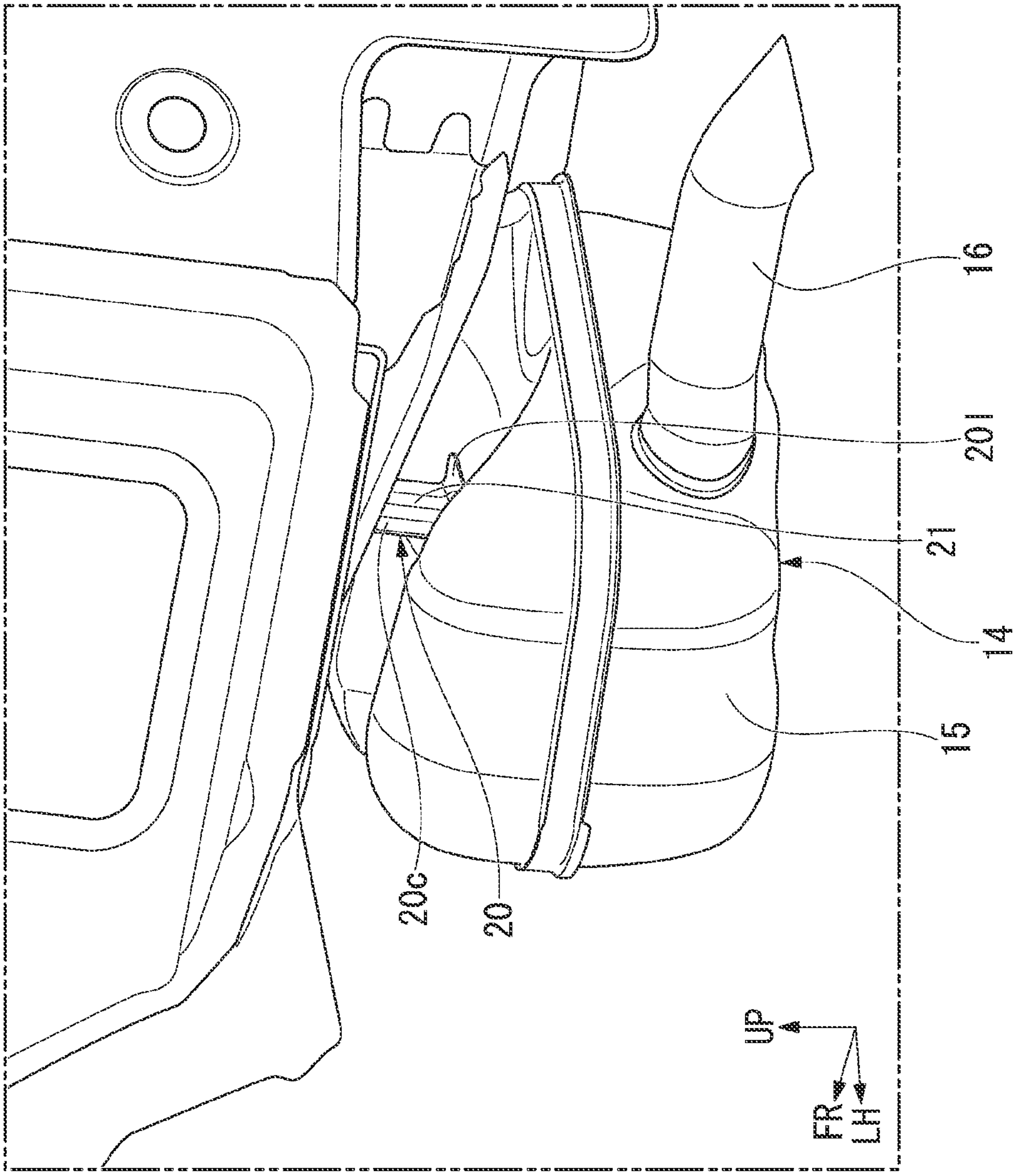
FIG. 4 is a perspective view of the vehicle of the embodiment showing a state in which the silencer is attached.

FIG. 3 is a perspective view showing an attachment position of the silencer 14 on a lower surface of the vehicle 1 at a rear side, and FIG. 4 is a perspective view of the vehicle 1 showing a state in which the silencer 14 is attached. Further, in FIG. 3, a state in which the silencer 14 is removed is shown.

The silencer 14 is fixed to lower surfaces 10*u* of the rear side frames 10 via a metal bracket 20. The bracket 20 includes an upper flange 20*u* fixed to the lower surfaces 10*u* of the rear side frames 10, a lower flange 201 fixed to an upper surface of the housing 15 of the silencer 14, and a connecting wall 20*c* configured to connect the upper flange 20*u* and the lower flange 201. Reinforcement beads 21 extending in a direction in which the upper flange 20*u* and the lower flange 201 are connected are formed on the connecting wall 20*c*.

As shown in FIG. 2, the silencer 14 is fixed to a position located front than an intermediate position cp which is between the rear wheels Wr and the rear end portions of the rear side frames 10. That is, the upper flange 20*u* of the fixing bracket 20 is fixed to a position located front than the intermediate position cp of the lower surfaces 10*u* of the rear side frames 10.

Here, as shown in FIG. 1, the housing 15 of the silencer 14 is formed in a substantially trapezoidal shape when seen in a bottom view (a plan view). Specifically, the housing 15 of the silencer 14 is formed in a shape in which a front-to-rear width is gradually reduced from an inner side toward an outer side in the vehicle width direction. A portion of the housing 15 of the silencer 14, in which a front-to-rear width on an outer side in the vehicle width direction is small, is located behind the rear wheels Wr. Accordingly, a part of the silencer 14 is disposed at vehicle-rear-side of the rear wheels Wr so as to overlap the rear wheels Wr in the forward/rearward direction.

Further, while the silencer 14 is disposed below each of the left and right rear side frames 10 in the embodiment, the silencer 14 may be disposed below only one of the left and right rear side frames 10.

Figure 5:
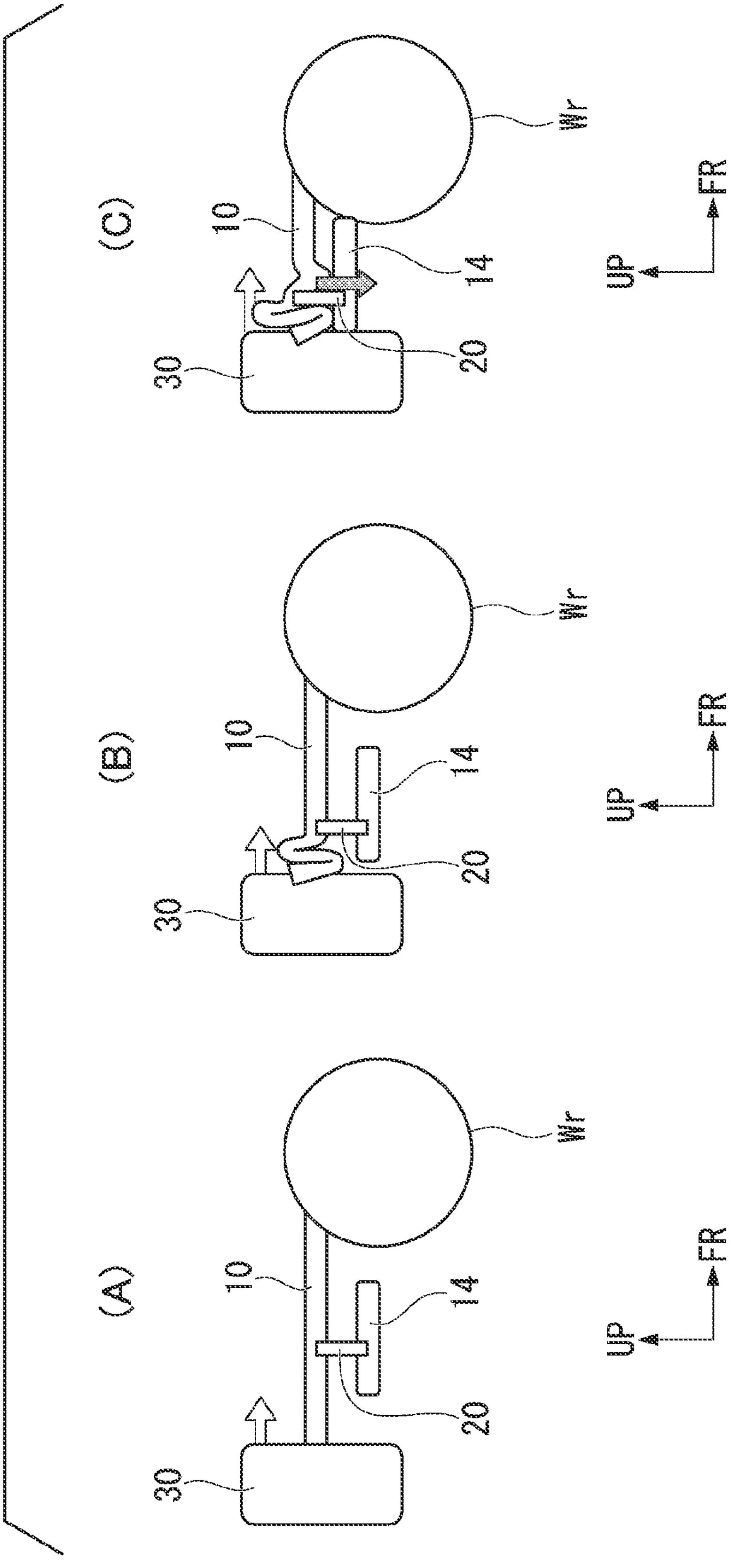
FIG. 5 is a schematic side view of the vehicle body of the embodiment showing a deformation behavior of the vehicle in sequence of (A), (B) and (C).

FIG. 5 is a schematic side view showing a deformation behavior of the vehicle 1 in sequence of (A), (B) and (C) when an impact load is input to the vehicle 1 from a symmetric object 30 on the rear side.

Hereinafter, the deformation behavior of the vehicle 1 when the impact load is input from behind the vehicle will be described with reference to FIG. 5.

For example, when the impact load is input to the rear bumper of the rear part of the vehicle to the symmetric object 30, the impact load is transmitted to the rear parts of the rear side frames 10 toward the front side of the vehicle via a rear bumper as a load (see (A) of FIG. 5).

The rear side frames 10 receive the impact load and gradually collapse from the side of the rear part toward the front side. (see (B) of FIG. 5).

In this way, when the rear side frames 10 are collapsed and deformed by a predetermined amount or more, the impact load is also transmitted to the rear part of the silencer 14, and thus, the silencer 14 is sandwiched between the symmetric object 30 of the vehicle and the rear wheels Wr. Here, the silencer 14 collapses in the forward/rearward direction together with the rear side frames 10 and absorbs energy from behind the vehicle.

From this state, when the input of the impact load further progresses, the intermediate part of the rear side frames 10 in the extension direction may be folded and deformed upward. However, at this time, the lower surfaces 10*u* of the rear side frames are fixed to the silencer 14 sandwiched between the object 30 on the rear side and the rear wheels Wr. For this reason, the folding deformation at the intermediate part of the rear side frames 10 is restricted by the silencer 14 (see (C) of FIG. 5).

As a result, energy of the impact load input from behind the vehicle is sufficiently absorbed by the collapse of the rear side frames 10 and the silencer 14.

As described above, in the vehicle body rear structure of the embodiment, when the impact load is input from behind the vehicle, folding deformation of the rear side frames 10 can be restricted by the silencer 14 (collapsing member) sandwiched between the object 30 on the rear side and the rear wheels Wr. Accordingly, when the vehicle body rear structure of the embodiment is employed, the rear side frames 10 can be stably collapsed upon input of the impact load from behind the vehicle.

Accordingly, by employing the vehicle body rear structure of the embodiment, collision safety of the vehicle can be increased to contribute to development of a sustainable transportation system.

In addition, the vehicle body rear structure of the embodiment uses the silencer 14 for exhaust silencing as a collapsing member disposed at vehicle-rear-side of the rear wheel. For this reason, the existing silencer 14 can be used to efficiently absorb the impact load without specially providing a dedicated collapsing member for impact absorption. Accordingly, when the configuration of the embodiment is employed, the safety of the vehicle 1 can be further improved while suppressing the increase in the product cost of the vehicle 1.

In addition, in the vehicle body rear structure of the embodiment, the silencer 14 that is a collapsing member is fixed to the rear side frame 10 at a position in front side than the intermediate position cp between the rear wheels Wr and the rear end portion of the rear side frame 10. For this reason, the silencer 14 is positioned close to the base end side (side sill side) of the side frame 10, and when an impact load is input from behind the vehicle and the rear side frame 10 begins to collapse from the rear side, the position of the silencer 14 is less likely to change greatly. Accordingly, when the impact load is input from behind the vehicle, the silencer 14 is stably sandwiched between the object 30 and the rear wheels Wr in the rear of the vehicle. Accordingly, when the configuration of the embodiment is employed, upon input of the impact load from behind the vehicle, folding deformation of the rear side frames 10 at the intermediate part can be more reliably restricted.

Further, in the vehicle body rear structure of the embodiment, the silencer 14 that is a collapsing member is fixed to lower surfaces 14*u* of the rear side frames 10 at below the rear side frames 10. For this reason, upon input of the impact load from behind the vehicle, when the silencer 14 is sandwiched between the object 30 and the rear wheels Wr behind the vehicle, folding deformation of the rear side frames in the upward/downward direction can be stably restricted without occurring twisting of the rear side frames 10. That is, in the configuration, since folding deformation of the rear side frames in the upward/downward direction can be restricted from a position just below the rear side frames 10, twisting is less likely to occur in the rear side frames 10, like the case in which the silencer is fixed to the side surfaces of the rear side frames 10.

Accordingly, when the configuration of the embodiment is employed, upon input of the impact load from behind the vehicle, the rear side frames 10 can be more stably collapsed.

Further, the present invention is not limited to the above-mentioned embodiment, and various design changes may be made without departing from the scope of the present invention.

For example, in the above-mentioned embodiment, while only a part of the silencer 14 that is the collapsing member is disposed to overlap, the rear wheels Wr in the forward/rearward direction behind the rear wheels Wr, the entire collapsing member may be disposed to overlap the rear wheels Wr in the forward/rearward direction behind the rear wheels Wr.

In addition, in the above-mentioned embodiment, while the silencer 14 that is the collapsing member is disposed so as to overlap the rear wheels Wr in the forward/rearward direction behind the rear wheels Wr, the collapsing member is not limited to the silencer 14. The collapsing member may be functional parts other than the silencer 14. Further, the collapsing member may be a component dedicated to impact absorption.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body rear structure comprising:

a rear wheel disposed on a vehicle side portion;

a rear side frame that is disposed substantially along a vehicle forward/rearward direction and that extends to a vehicle-rear-side than the rear wheel; and a collapsing member that is disposed at the vehicle-rear-side of the rear wheel so that at least a part of the collapsing member overlaps the rear wheel in the forward/rearward direction, wherein the collapsing member is fixed to the rear side frame, and wherein the collapsing member is fixed to the rear side frame at a position in front side than an intermediate position between the rear wheel and a rear end portion of the rear side frame.

2. The vehicle body rear structure according to claim 1, wherein the collapsing member is a silencer for exhaust silencing.

3. The vehicle body rear structure according to claim 1, wherein the collapsing member is fixed to a lower surface of the rear side frame at below the rear side frame.

* * * * *